Aug. 11, 1925.                     1,549,609
H. B. REDDING
GATE VALVE
Filed Oct. 8, 1921
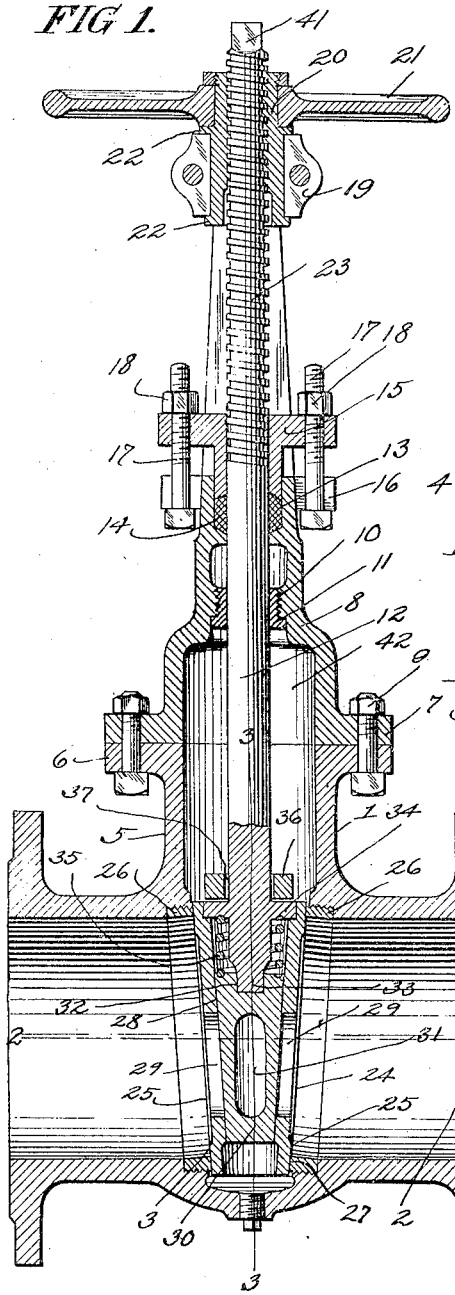
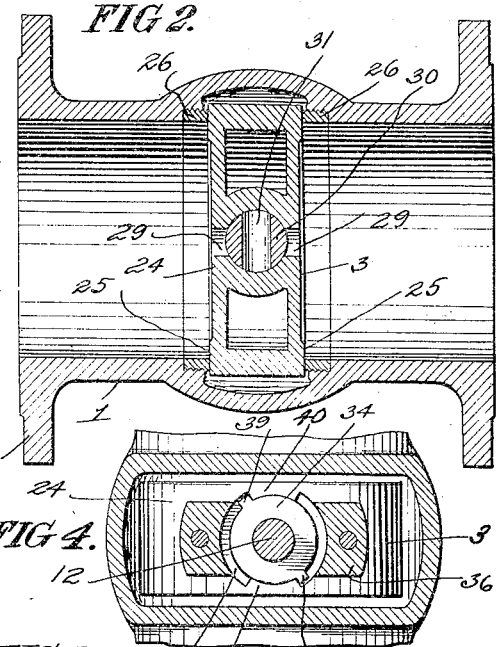
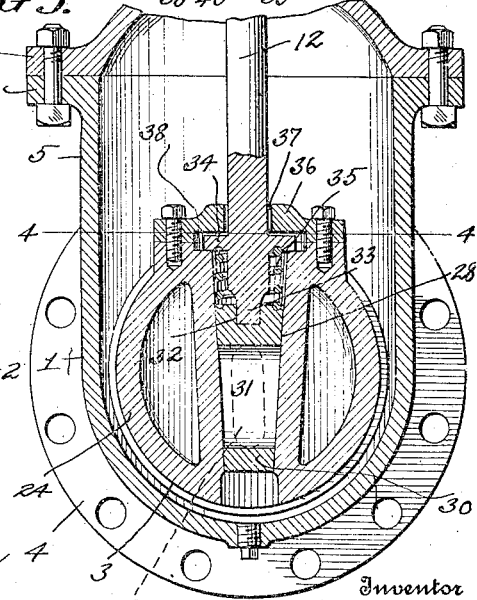
Inventor
Harry B. Redding
By C. C. Shepherd
Attorney Patented Aug. 11, 1925.

1,549,609

UNITED STATES PATENT OFFICE.

HARRY B. REDDING, OF COLUMBUS, OHIO, ASSIGNOR, BY DIRECT AND MESNE ASSIGNMENTS, TO THE REDDING VALVE COMPANY, OF COLUMBUS, OHIO, A CORPORATION OF DELAWARE.

GATE VALVE.

Application filed October 3, 1921. Serial No. 506,480.

*To all whom it may concern:*

Be it known that HARRY B. REDDING, a citizen of the United States, residing at Columbus, in the county of Franklin and State of Ohio, has invented certain new and useful Improvements in Gate Valves, of which the following is a specification.

This invention relates to improvements in valves, and has specific reference to that class of valves formally known as gate valves, wherein a sliding closure is provided for controlling fluid passageway for controlling fluid flow through the main passageway of the valve by assuming positions obstructing or opening the said passageway.

Valves of this type are formally employed in connection with piping systems wherein fluid under relatively high pressure is received and therefore it becomes a difficult matter when a valve is closed to effect its opening, since the fluid pressure on the closure thereof is such that the closure can not be manually opened until the fluid pressure on both sides of the closure has become balanced to thus overcome the frictional pressure exercised upon the closure the latter occupies a shut position. It has been common for gate valve manufacturers to form said valves with lateral passageways disposed in communication with the main passageway through the valve and adapted to surround a shunt and slidable gate or closure of the valve. These lateral passageways are in themselves equipped with relatively reduced valves, which when opened allow the fluid in one side of a valve to pass around the main closure to the other side of a valve, thereby permitting the fluid pressure to exert itself equally on both sides of the closure, after which the said closure may be manually or otherwise operated to effect its opening and closing movements. This common arrangement is open to objection from numerous angles; in the first place the same is expensive and difficult to manufacture, and provides a multiplicity of parts and joints, which are likely to become out of order and to require constant repair and attention, and secondly the lateral passageways permit of a passage of fluid therethrough under considerable velocity, and if the fluid contains foreign particles or other substances, the said fluid when issuing from the lateral passageway will engage the walls of the main passageway of the valve with a considerable force, causing undue wear upon the walls so engaged and thus resulting in a comparatively short time in the replacement of the valve.

The present invention has for its main object the provision of a gate valve which will possess, first of all, simplicity in construction and wherein the complication and multiplicity of parts found in the common lateral passageway valve will be eliminated, for the purpose of rendering the valve convenient and simple to operate, of long life, and wherein repair and replacement of the various parts thereof will be reduced to a minimum.

Another object of the invention rests in the provision of a gate valve wherein is formed a compound closure structure for controlling the fluid passageway in the body of the valve, the said closure being formed to embody the usual wedge shaped gate, arranged to be positioned within a wedge shaped socket or seat formed in the body of the valve and to thus obstruct in the ordinary manner the fluid passageway, and in providing the said gate with an internal supplemental valve connected with the operating stem of the valve proper, the construction being such that when the stem is initially rotated the said supplemental valve will be opened to admit of a limited passage of fluid through the gate so that the fluid pressure may be equalized on both sides of the gate, whereby upon continued operation of the stem the gate proper may be raised or lowered in the ordinary manner admitting of the desired fluid passage through the valve.

For a further understanding of the invention, reference is to be had to the following description and to the accompanying drawing, in which:

Figure 1 is a vertical sectional view taken through a valve constructed in accordance with the features of the invention, Figure 2 is a horizontal sectional view taken through the valve on the plane indicated by the line 2—2 of Figure 1, Figure 3 is a vertical transverse sectional view taken through the valve on the plane indicated by the line 3—3 of Figure 1, and Figure 4 is a horizontal sectional view taken on the plane disclosed by the line 4—4 of Figure 3.

In the specific embodiment of the invention illustrated in the drawing, my improved valve is disclosed as consisting of the usual metallic body 1 having a fluid passageway 2 extending longitudinally therethrough and wherein the flow of a fluid through said passageway is governed by means of a sliding gate or closure 3, to be hereinafter more particularly described. The ends of the body may be formed with the usual integral collars or flanges 4 by means of which the valve may be connected in the ordinary manner, with associated piping or other apparatus, not shown. Arising centrally from the body 1, between the flanges 4, is an extension 5 having its upper or outer end terminated in a flange 6. This flange is adapted to receive a cooperating flange 7 provided upon the lower end of a hollow stem guide 8, a securing device 9 may pass through aligned openings formed in the flanges 6 and 7 for the purpose of rigidly retaining the guide 8 in connection with the body 1.

The said guide 8 is provided, intermediately of its length with threads 10 adapted for the reception of a renewable wear nut 11, in which operates the slidably mounted closure operating stem 12 of the valve. The upper or outer end of the guide 8 is formed with a socket 13, adapted for the reception of a packing 14, which is situated around the stem 12 and is firmly maintained in engagement therewith by means of the usual gland nut 15. The nut 15 is capable of compressively engaging the packing 14 by providing the upper end of the guide 8 with a notched collar 16, in which is positioned a plurality of threaded bolts 17, also disposed to pass through openings provided therefor in the nut 15, the upper end of said bolts being equipped with nuts 18, capable upon operation of forcing the gland 15 downwardly or inwardly upon the packing 14, with sufficient pressure to retain fluids under pressure within the valve proper. Formed with the guide 8 and disposed above the packing gland is a split collar construction 19, which is situated to receive for rotation an extended hub 20 of a stem operating wheel 21. The hub 20 is suitably flanged as at 22 so that the same will rotate, as usual, within the collar 19, and the said hub 20 may then be integrally or otherwise suitably connected with the wheel 21 so that upon the manipulation of the latter rotation will be imparted to the hub. As usual, the hub is internally threaded to receive the upper threaded end 23 of the stem 12 and it will be manifest that by this construction and upon the rotation of the wheel 21 sliding or longitudinal movement will be imparted to the stem, thus causing the raising and lowering of the gate or closure structure 3 in the usual manner common to valves of this character.

The gate or closure 3 is formed to include a wedge shaped circular body 24, which body possesses a diameter greater than that of the passageway 2 so that when in a closed or shut position the body will completely obstruct the passageway, the opposite sides of the body, designated by the numeral 25, are of substantially flat planular construction and diverge upwardly or outwardly, and the same are adapted to be forced into frictional engagement with similarly inclined seating rings 26, removably threaded in the body 1 of the valve. By this construction it will be apparent that the closure may be forced into or out of the wedge formed socket 27 provided between the rings 26 by manipulation of the stem 12.

The present invention aims to provide a valve of this character with an improved by-pass construction which will permit of the balancing of fluid pressure upon opposite sides of the closure 3 preparatory to raising and lowering movements on the part of said closure, and to permit this result to be obtained in an efficient, practical and simple manner. To this end the closure body 24 is provided with a tapering socket 28, disposed in communication with ports 29, whereby through the medium of the socket 28 and the communicating ports 29 fluid flow through the passageway 2 may be established even when the closure proper occupies its seated or lowered position. Normally, however, such fluid flow is arrested by providing the socket 28 with a valve plug 30, which conforms to the formation of the socket 28 and is adapted to be seated for rotation therein, the said plug being provided with a port 31 capable of being brought into or out of registration with the ports 29. The top of the plug 30 is formed with a polygonal sided pocket 32, in which is received a similarly formed lower end 33 of the stem 12. The stem, immediately above the end 33 is formed with a collar 34, and a coil spring 35 situated between said collar and the upper end of the plug 30, causing said plug to be firmly retained within the socket 28 and in proper registration with the ports 29. Bolted or otherwise secured to the top of the closure body 24 is a cap plate 36 having an axial opening 37 formed therein for the reception of the stem 12, the said opening being of less diameter than the collar 34 in order that said collar will be confined within the upper enlarged end 38 of the pocket 32. The collar 34 is provided with offset studs 39, which are capable of engaging with inwardly extending integral projections 40 provided upon the walls and the pocket 38, whereby the engagement of the studs 39 with the projections 40 will serve to limit the rotative movement of the plug 30 within its socket, the movement allowed said plug being substantially one-fourth of a circle, or 90°, which will be sufficient to permit the port 31 therein to be properly brought into or out of registration with the ports 29.

To effect the opening of the valve, the upper end of the stem is in this instance, equipped with a polygonal sided projection 41 capable of receiving a suitable wrench or the like, not shown, by means of which the stem may be rotated manually to the left. The rotation of the stem may be continued for a distance of approximately 90° or until the stubs 39 on the collar 34 thereof engage with the fixed projections 40. By reference to Figures 2 and 4 it will be observed that the rotation of the stem to the left will cause the port 31 to be turned so that the same will properly register with the ports 29, thus establishing communication between the opposite sides or ends of the passageway 2 with respect to the closure 3. By thus initially opening the valve it will be apparent that fluid will be permitted to flow through the valve until the pressure thereof will be balanced or equally applied to both sides of the closure 3. When this balance has been obtained, the wheel 21 is then rotated to the left, causing the elevation or longitudinal outward movement of the stem 12, which results in lifting the closure 3 and the parts contained thereby bodily from the socket 27 and out of engagement with the seating rings 26, the closure being permitted to pass upwardly into the chamber 42 formed between the extension 5 and the lower part of the guide 8, thus clearly opening the passageway 2 and permitting of the desired fluid flow through the valve. In closing the valve the wheel 21 is first turned to the right, to cause the stem to move downwardly thereby forcing the closure into the shut position disclosed in Figure 1. This operation can be easily effected and without undue resistance by reason of the fact that the flow of fluid through the valve is still permitted by reason of the open valve plug 30. After the closure has been firmly seated against the rings 26 the stem is given substantially a quarter turn by a suitable tool applied to the projection 41, thereby causing the plug 30 to assume its closed position, finally obstructing fluid flow throw the passageway 2. It will thus be apparent that the construction provided enables the closure 3 to be easily opened or closed. The construction eliminates the use of the expensive and complicated by-pass constructions now ordinarily employed in valves of this kind, enables the valve to be simply and readily manufactured and furthermore permits of a natural operation in the opening or closing thereof without undue strain upon the operator.

What is claimed is:

In a gate valve, a casing including a main fluid passageway, a closure slidably mounted within said casing and capable of governing fluid flow through said passageway, a longitudinally movable operating stem having its inner end connected with said closure and capable of causing the latter to assume passageway opening or closing positions, said closure being formed to include an internally situated valve socket and communicating ports, a tapered plug arranged to be seated within said socket and rotatably mounted therein, a connection between said stem and said plug permitting of the rotation of the latter, and spring means cooperative with the plug and stem and serving to maintain said plug in its seated position within said socket.

In testimony whereof I affix my signature.

HARRY B. REDDING.